United States Patent [19]
Akiyama et al.

[11] Patent Number: 5,170,195
[45] Date of Patent: Dec. 8, 1992

[54] COOLING DEVICE FOR A LIQUID CRYSTAL PANEL

[75] Inventors: Masayuki Akiyama; Yasunori Hiroshima; Junya Tokuda; Manabu Akagi; Yoichi Sato, all of Tokyo, Japan

[73] Assignee: Pioneer Electronic Corporation, Tokyo, Japan

[21] Appl. No.: 691,918

[22] Filed: Apr. 26, 1991

[30] Foreign Application Priority Data

Sep. 17, 1990 [JP] Japan ................... 2-246543
Sep. 17, 1990 [JP] Japan ................... 2-246544
Sep. 18, 1990 [JP] Japan ................... 2-249739

[51] Int. Cl.[5] .................................. G03B 21/16
[52] U.S. Cl. .................................. 353/54; 353/52; 359/62
[58] Field of Search ............... 353/54, 55, 56, 52, 353/DIG. 5; 350/331 R, 331 T, 351, 330; 359/36, 41, 62, 63

[56] References Cited

U.S. PATENT DOCUMENTS

| 4,763,993 | 8/1988 | Vogeley et al. | 350/331 T |
| 4,772,098 | 9/1988 | Ogawa | 353/54 |
| 5,032,021 | 7/1991 | Kanatani et al. | 353/54 |

FOREIGN PATENT DOCUMENTS

| 60-136045 | 9/1985 | Japan . | |
| 0294230 | 12/1987 | Japan | 353/52 |
| 0296126 | 12/1987 | Japan | 353/52 |
| 0220113 | 9/1988 | Japan | 353/52 |

Primary Examiner—William A. Cuchlinski, Jr.
Assistant Examiner—William C. Dowling
Attorney, Agent, or Firm—Nikaido, Marmelstein, Murray & Oram

[57] ABSTRACT

A cooling device has a container filled with a coolant. A front side and a rear side of the container are transparent. A heatsink is provided for cooling the container. A liquid crystal panel is attached to one of the sides. Convection enhancing means is provided for enchancing convection of the coolant in the container.

14 Claims, 11 Drawing Sheets

FLOW RATE OF COOLING AIR (m/sec)

COOLING DEVICE FOR A LIQUID CRYSTAL PANEL

BACKGROUND OF THE INVENTION

The present invention relates to a cooling device for preventing high temperature deterioration of a liquid crystal and a polarizing plate contained in a liquid crystal panel which is used in an optical device such as a liquid crystal projector.

FIG. 23 shows schematically a liquid crystal projector. Light Ls emitted from a light source L has components of blue, red and green. The light Ls reflected by a concave mirror CM is changed to parallel beams by a condenser lens CL. Blue light Lb is separated from the light Ls by a dichroic mirror DMb1, and red light Lr is separated by a dichroic mirror DMr1, and remaining green light Lg goes straight.

The blue light Lb is bent at a right angle by the dichroic mirror DMb1 and further bent at a right angle by a mirror Mb1. The red light Lr is bent by mirrors DMr1 and Mr1. Thus, the blue light Lb, red light Lr and green light Lg go straight in parallel.

In the respective light paths, transparent liquid crystal panels LCb, LCr, and LCg are provided for corresponding colors, so that light beams Lb, Lr and Lg are changed to transmitted light beams lb, lr and lg each having image information of the respective color. The blue light lb is reflected by a mirror Mb2 and a dichroic mirror DMb2 and enters in the path of the green light lg. The red light lr is reflected by a mirror Mr2 and a dichroic mirror DMr2.

Thus, all transmitted light beams lb, lr and lg become a light ls. The light ls is projected on a screen S through a lens PL.

In such a projection system, the liquid crystal panels LCb, LCr and LCg are heated by the projected light at a high temperature. If liquid crystal and polarizing plates in the liquid crystal panel become high temperature, their characteristics are deteriorated. Therefore, it is necessary to provide a cooling device for cooling the liquid crystal panels.

FIG. 24 shows an air cooling system for liquid crystal panels. In the system, liquid crystal panels LCb, LCr and LCg are mounted on a base plate SP at respective openings Wb, Wr and Wg formed in the base plate. The liquid crystal panels are cooled by cooling air CW from a blade FB of a cooling fan CF.

Temperature decrement $\Delta T$ with respect to ambient temperature is expressed as follows.

$$\Delta T = Q/\alpha A$$

where Q is the heat quantity of the cooled body, A is the surface area of the cooled body, $\alpha$ is the heat transfer rate between air and the cooled body.

The heat transfer rate $\alpha$ is expressed as follows.

$$\alpha = \lambda/L \times 0.66 Pr^{\frac{1}{3}} \times (UL/v)^{\frac{1}{2}}$$

where $\lambda$ is the heat conductivity, L is the distance, Pr is the Prandtle number, U is the flow rate of air, v is a coefficient of dynamic viscosity.

Therefore, the cooling efficiency for the liquid crystal panels LCb, LCr, and LCg increases with the flow rate of the cooling air CW theoretically. However, when the flow rate of the cooling air exceeds a certain value, the cooling efficiency does not increase in proportion to the flow rate.

FIG. 25 shows the decrease of surface temperature of a polarizing plate with respect to the increase of flow rate of cooling air. From the graph, it will be seen that the temperature of the polarizing plate hardly decreases when the flow rate exceed 1.0 m/sec..

The inventors of the present invention have proposed to cool the liquid crystal and the polarizing plate with cooling liquid having a large heat capacity, for example in Japanese Utility Model Laid Open 60-136045.

SUMMARY OF THE INVENTION

The object of the present invention is to provide a cooling device which may effectively cool the liquid crystal panel with cooling liquid.

According to the present invention, there is provided a cooling device comprising a container having a front side and a rear side and filed with a coolant, both the sides being formed with transparent material, a heatsink for cooling the container, a liquid crystal panel attached to one of said sides.

In an aspect of the inventions, liquid a crystal panel is directly attached to the container serving as one of the sides.

In another aspect, convection enhancing means is provided for forming passages enhancing the convection of the coolant in the container. Pressure regulator means such as an expansible accumulator is provided for regulating pressure of the coolant.

The other objects and features of this invention will become understood from the following description with reference to the accompanying drawings.

DETAILED DESCRIPTION OF THE PREFERRED EMBODIMENTS

Figure 1:
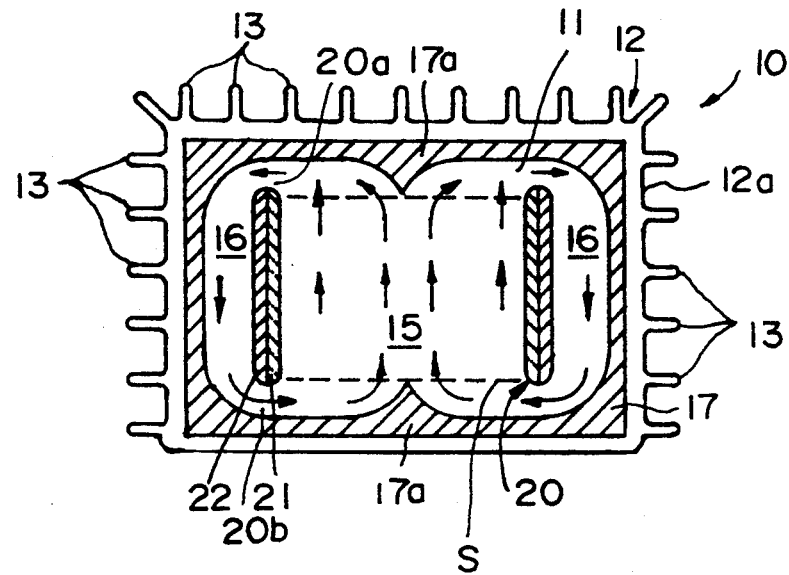
FIG. 1 is a sectional view showing a cooling device of the present invention as a first embodiment.

Referring to FIG. 1, a cooling device 10 has a container 12 defining a thin chamber having a rectangular sectional shape.

The container 12 comprises a surrounding wall 12a and opposite transparent plates 12b and 12c secured to the front and rear sides of the surrounding wall 12a. The surrounding wall 12a is made of metal or other material having a high heat conductivity. A heatsink 13 comprising a plurality of radiating fins is provided on the outer periphery of the surrounding wall 12a, and a guide member 17 is provided on the inner side of the wall The guide member 17 has a pair of projections 17a on the upper inner wall and the lower inner wall of the guide member 17, thereby forming a pair of cooling zones therein. The space 11 in the guide member 17 is filled with coolant 14 of non-volatile liquid and having a high transmissivity such as ethylene glycol.

In each of the cooling zones, a convection enhancing member 20 comprising a vertical plate is provided, forming an upper passage 20a and a lower passage 20b. The convection enhancing member 20 comprises a heat insulator layer 21 of heat insulator such as glass and a heat conductive layer 22 of metal having a high thermal conductivity as aluminum, which are overlaid with each other. The heat conductive layer 22 is secured to the inside wall of the container 12 and disposed at the outside of the convection enhancing member 20 so as to oppose to the inner wall of the container 12. The convection enhancing member 20 has a height slightly higher than the height of a light transmitting area S.

Figure 2:
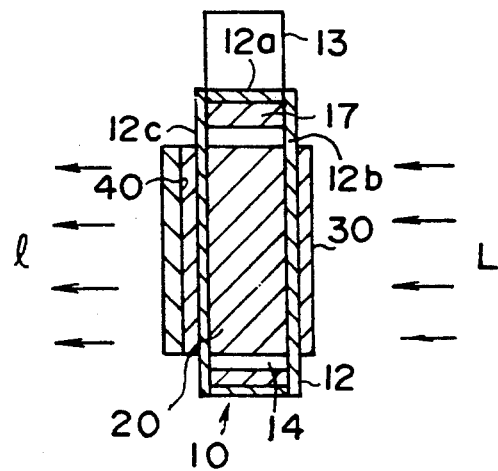
FIG. 2 is a sectional side view of the cooling device.

As shown in FIG. 2, a polarizing plate 30 is attached on a front side of the cooling device 10 and a liquid crystal panel 40 is attached to a rear side.

Projected light L passes through the polarizing plate 30, cooling device 10 and liquid crystal panel 40, and becomes transmitted light l having image information.

The polarizing plate 30 and the liquid crystal panel 40 are heated by the light L. The heat of the polarizing plate 30 and the liquid crystal panel 40 is transmitted to the cooling liquid through the wall of the metallic container 12 to increase the temperature of the coolant 14. The heated coolant ascends in the space between the heat insulator layers 21 as an ascending flow 15. Since the ascending flow 15 is surrounded by the insulator layers 21, the temperature of coolant does not decrease. Consequently, the coolant effectively ascends in the space.

The coolant 14 in the upper zone in the space 11 is expelled by the ascending flow 15 and descends along the inside wall of the container 12 as descending flow 16. The heat of the descending coolant is transmitted to the heat conductive layers 22 and to the wall of the container 12 and radiated from the radiating fins 13. Thus, the temperature of the descending coolant effectively decreases, so that the descending of the coolant is enhanced and the coolant having a low temperature is supplied to the light transmitting area S. Since the cooled coolant enters the large space 11 from the narrow passage 20b, the coolant swirls in the space, so that the coolant is equally supplied to the space to uniformly cool the polarizing plate 30 and the liquid crystal panel 40. Accordingly, the polarizing plate 30 and the liquid crystal panel 40 are efficiently cooled below the endurable temperature thereof. In an experiment where a cooling device without the convection enhancing member 20, the polarizing plate 30 and the liquid crystal panel 40 are kept at 55° C. To the contrary, in an experiment using a cooling device with the convection enhancing member, the temperature of the polarizing plate and the liquid crystal panel reduces below 55° C. Therefore, the cooling device of the present invention can keep the temperature of the polarizing plate and the liquid crystal panel below the endurable temperature 60° C.

Figure 3:
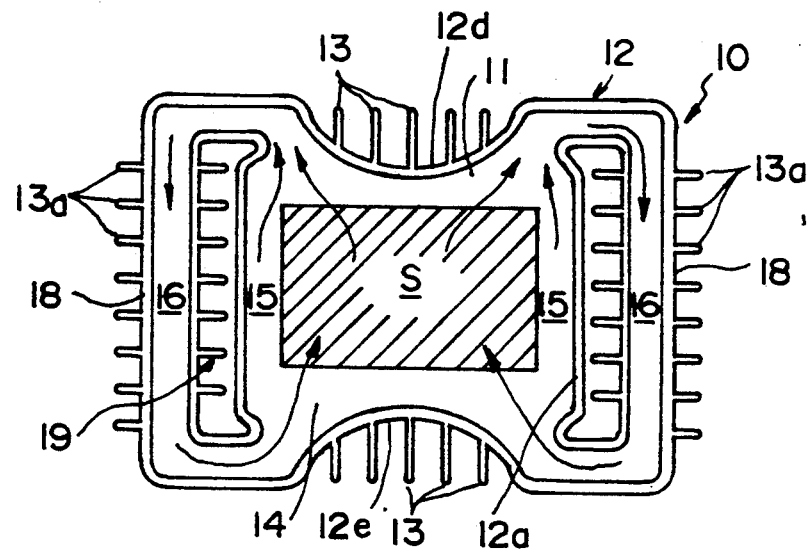
FIG. 3 is a sectional view of a second embodiment.
Figure 4:
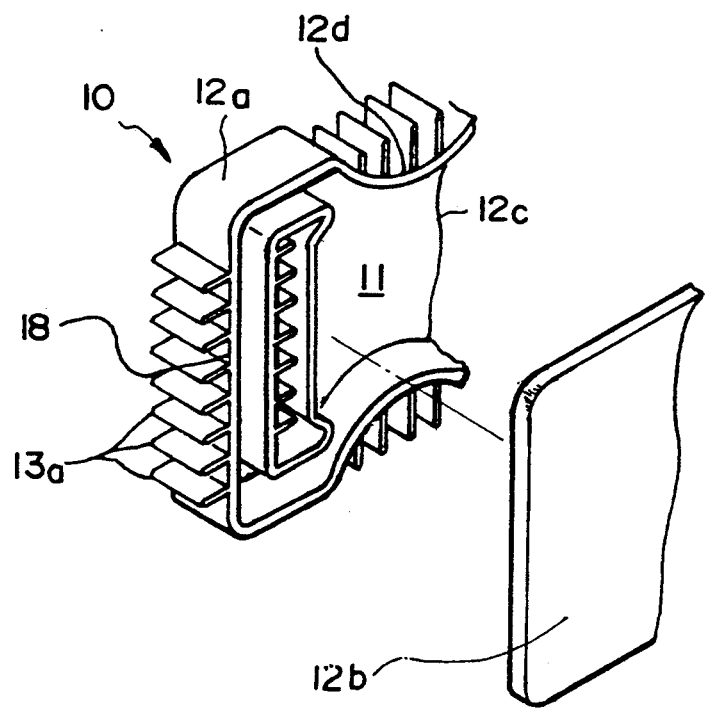
FIGS. 4 and 5 are perspective views partially showing the device of the second embodiment.

Referring to FIG. 3 showing the second embodiment, the cooling device 10 has outside circulating passages 18 on both sides thereof. The upper end of the passage 18 is communicated with the upper portion of the space 11 of the cooling device 10, and the lower end of the passage is communicated with the lower portion of the space 11. A plurality of radiating fins 13a are provided on the outside wall of the passage 18, so that the coolant is cooled from the all of the surrounding wall.

An upper wall 12d and a lower wall 12e of the container 12 are inwardly projected, each forming a rounded guide wall.

Although transparent plates 12b and 12c are attached to the both sides of the surrounding wall 12a, the polarizing plate 30 and the liquid crystal panel 40 may be directly attached to the surrounding wall 12a.

Figure 5:
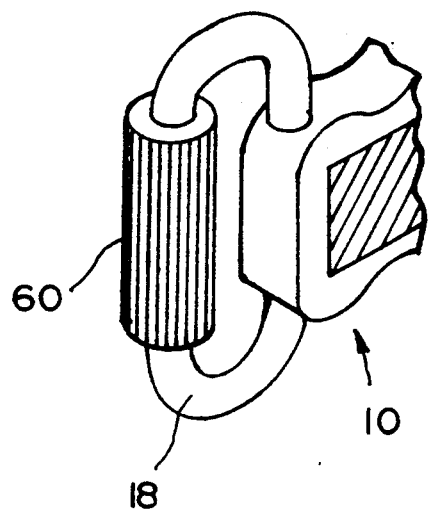

The cooling device 10 shown in FIG. 5 has a pump 60 for forcibly circulating the cooling liquid. A heat exchanger may be provided in the outside circulating passage 18.

Figure 6:
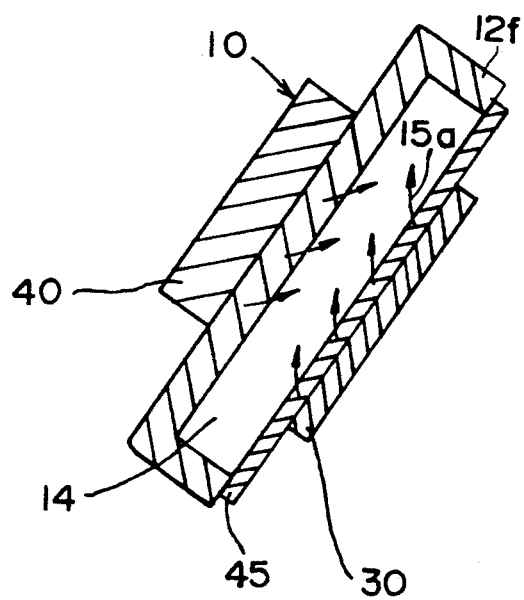
FIG. 6 is a sectional view showing a third embodiment which is obliquely disposed.

Referring to FIG. 6, the cooling device 10 comprises a container 12f and a glass plate 45 secured to the front edge of the container 12f. The container 12f is made of transparent material having a higher heat conductivity than the glass plate 45.

The polarizing plate 30 is attached to the glass plate 45 and the liquid crystal panel 40 is attached to the rear side of the container 12f.

The cooling device 10 is tilted, downwardly disposing the glass plate 45. Since the glass plate 45 is positioned lower, the heated coolant ascends as shown by arrows 15a and moves to the container 12f. Because the container 12f has a high heat conductivity, the coolant can be effectively cooled.

Figure 7:
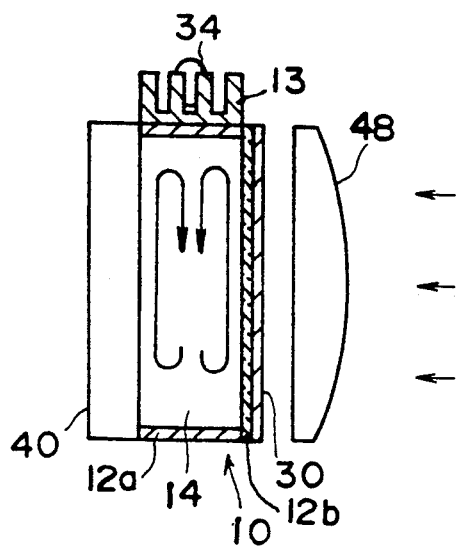
FIG. 7 is a sectional view showing a fourth embodiment.

Referring to FIG. 7 showing the fourth embodiment, the same reference numerals as the previous embodiments designate the same members as those. A convex condensor lens 48 is disposed apart from the polarizing plate 30. The liquid crystal panel 40 is directly fixed to the surrounding wall 12a.

In order to absorb the thermal expansion of the cooling liquid 14, an accumulator 34 is mounted on the surrounding wall 12a as pressure regulator means. The accumulator is disclosed in Japanese Utility Model Laid Open 60-136045. The accumulator 34 is made of rubber and communicated with the space in the cooling device 10. The thermal expansion of the cooling liquid is absorbed by the expansion of the accumulator 34, thereby keeping the pressure of the coolant constant.

Figure 8:
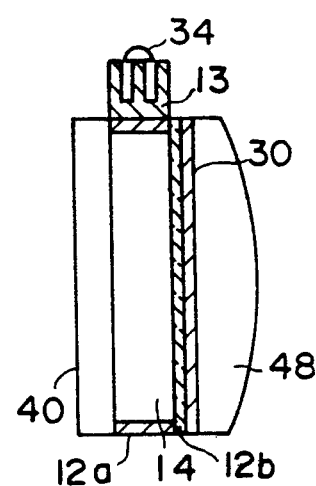
FIGS. 8 to 10 show modifications of the fourth embodiment.
Figure 9:
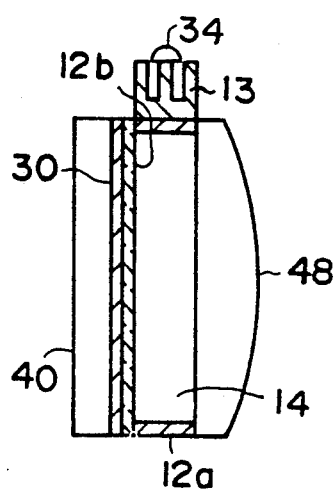
Figure 10:
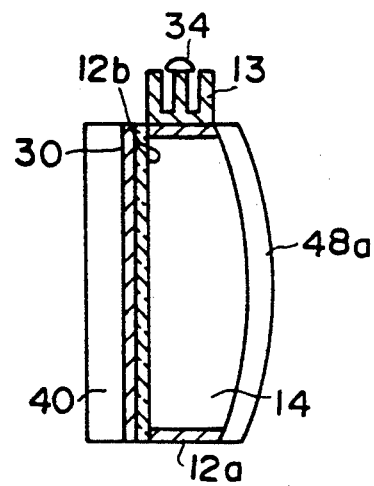

FIG. 8 to 10 show modifications of the cooling device of FIG. 7. The condensor lens 48 is attached to the polarizing plate 30 in the cooling device of FIG. 8. In the cooling device 10 of FIG. 9, the condensor lens 48 is directly attached to the front side of the surrounding wall 12a. The transparent plate 12b, polarizing plate 30 and liquid crystal panel 40 are superimposed with each other and the transparent plate 12b is secured to the rear side of the surrounding wall 12a. A condensor lens 48a of the cooling device of FIG. 10 has a concave shape at the inside thereof. Thus, a part of the coolant 14 serves as a part of the condensor lens 48 of FIG. 7.

Figure 11:
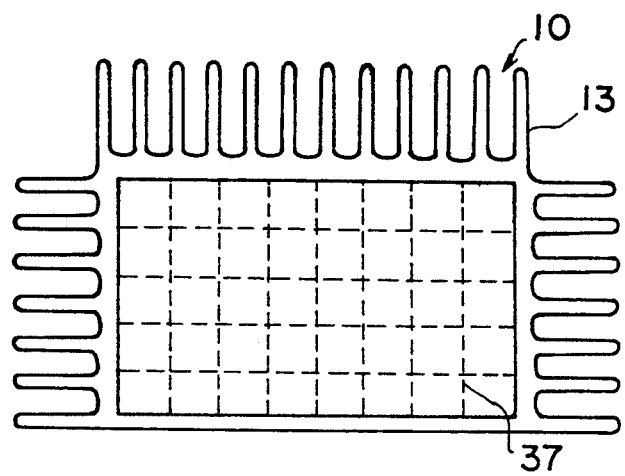
FIG. 11 is a front view of a fifth embodiment.
Figure 12:
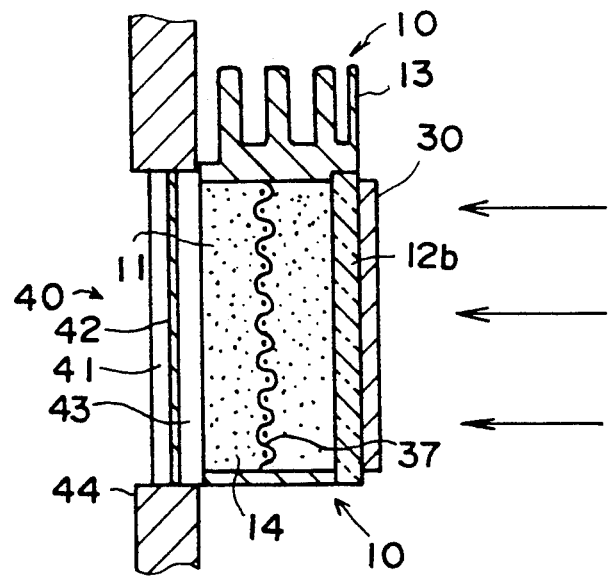
FIG. 12 is a sectional view of the device of FIG. 11.

Referring to FIGS. 11 and 12 showing the fifth embodiment, a heat conductive member 37 is provided in the space 11. The heat conductive member 37 is in the form of a metal net and secured to the inner wall of the surrounding wall 12a. The liquid crystal panel 40 comprises glass plates 41 and 43, liquid crystal 42 between the glass plates and a frame 44.

In accordance with the fifth embodiment, the heat of the coolant 14 is further transmitted to the heatsink 13 through the heat conductive member 37. Thus, the cooling effect of the device is improved.

Figure 13:
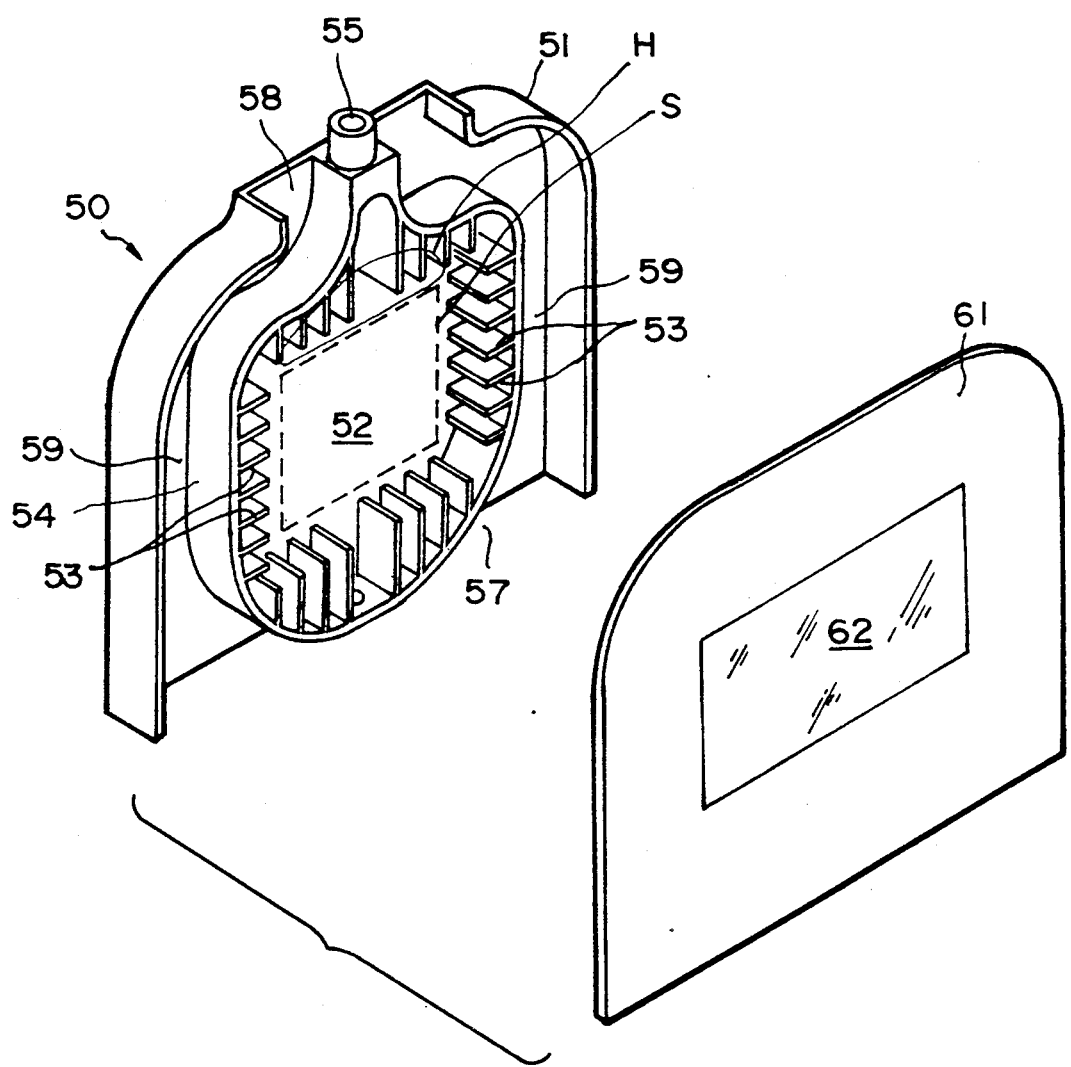
FIG. 13 is a perspective view showing a sixth embodiment.

Referring to FIG. 13 showing the sixth embodiment, a cooling device 50 is provided outside the container. The cooling device 50 comprises an outer wall 51, an inner wall 54 as a coolant container and secured to the outer wall 51 and disposed to form an air passage 59 therebetween, and a glass plate 61. A plurality of radiating fins 53 are provided on the inside of the inner wall 54 so as to surround a space 52 which is larger than the light transmitting area S. A coolant supply pipe 55 is formed on the top of the inner wall 54. An air inlet 57 is provided in the lower end of the outer wall 51, and an air outlet 58 is formed in the upper end thereof.

A liquid crystal device 62 comprising a liquid crystal panel and a polarizing plate is secured to the glass plate 61. When the glass plate 61 is secured to the outer wall 51 and the inner wall 54, the liquid crystal device 62 is inserted in the space 52. The space in the inner wall 54 is filled with the coolant.

The heat of the coolant is transmitted to the inner wall 54 through the radiating fins 53 and radiated form the wall in the cooling air passing through the air passage 59.

Figure 14:
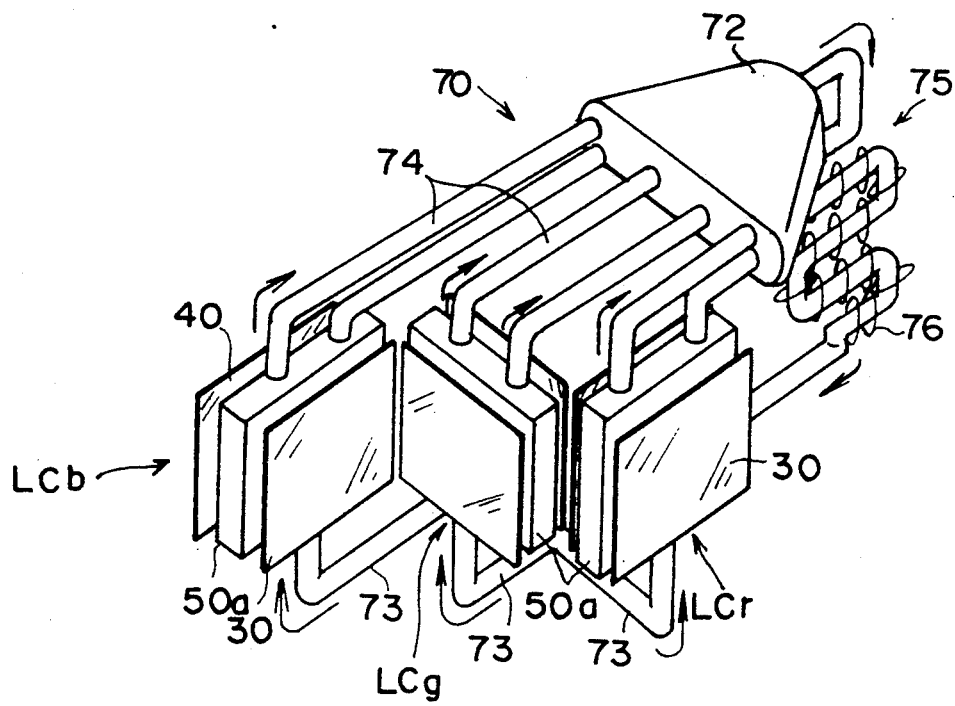
FIG. 14 is a perspective view of a forced circulation system.

The coolant in the inner wall 54 is forcibly circulated by a forced circulation device. FIG. 14 shows an example of the forced circulation device 70. A coolant container 50a is provided for each of the liquid crystal panels LCb, LCr and LCg of three colors. Coolant supply pipes 73 and discharge pipes 74 are provided between the coolant container 50a and a pump 72.

A heat exchanger 75 is provided for the supply pipes 73. A plurality of radiating fins 76 are provided on the supply pipe 73 for performing the heat exchange between the coolant in the pipe and air. The cooled coolant enters the container 50a from a lower portion thereof and discharges to the discharge pipe 74 from an upper portion of the container 50a. Thus, the polarizing plate 30 and liquid crystal panels 40 are efficiently cooled by the forcibly circulated coolant.

Figure 15:
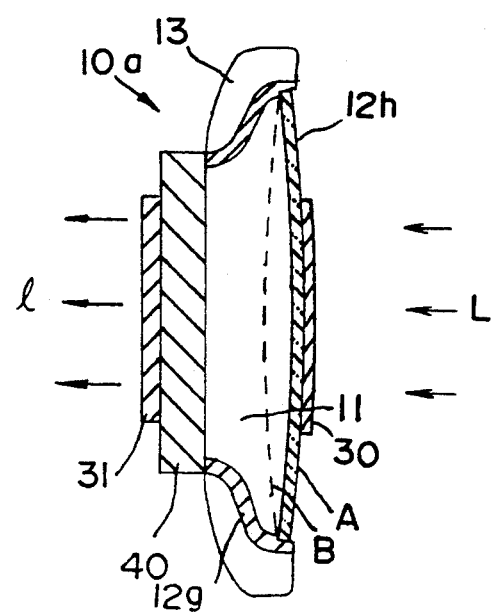
FIG. 15 is a sectional view of a seventh embodiment.
Figure 16:
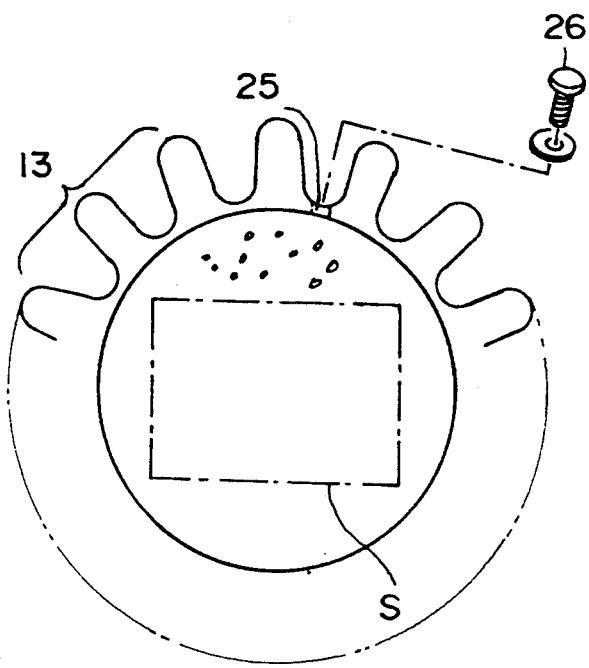
FIG. 16 is a schematic front view of the device of FIG. 15.

Referring to FIGS. 15 and 16 showing the seventh embodiment, the cooling device 10a comprises an annular surrounding wall 12g, a circular glass plate 12h secured to the front edge of the annular surrounding wall 12g, the liquid crystal panel fixed to the rear edge of the surrounding wall 12g, and polarizing plates 30 and 31. A charging hole 25 is formed in the surrounding wall 12g for charging the coolant to the space 11, which is closed by a plug 26.

The glass plate 12h has a small thickness to have a flexibility so as to be bent by pressure of the coolant in the space 11. Consequently, when the coolant expands due to the thermal expansion, the glass plate 12h is outwardly bent as shown by solid lines A to increase the capacity of the space 11. When the temperature of the coolant is low, the glass plate 12h is inwardly bent as shown by the dotted line B, thereby reducing the capacity. Thus, the pressure of the coolant is kept constant. Therefore, the cooling effect of the cooling device is not affected by the thermal expansion.

When the glass plate 12h expands as shown by the solid line A, the quantity of the coolant in a central portion corresponding to the heat transmitting area S increases. Accordingly, cooling effect for the polarizing plate 30 increases.

Figures 17, 18:
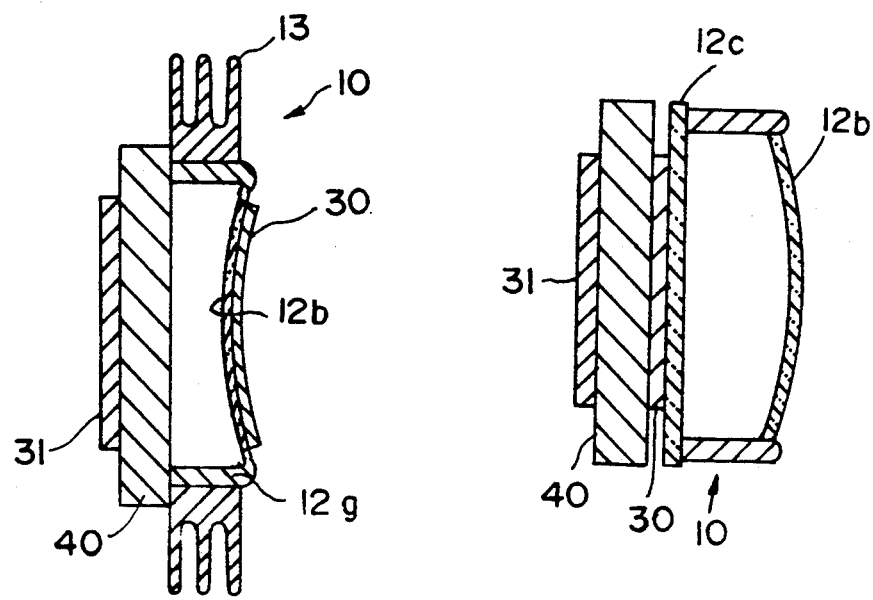
FIGS. 17 and 18 show modifications of the device.

The cooling device of FIG. 17 has a cylindrical surrounding wall 12g. In the cooling device shown in FIG. 18, the polarizing plates 30 and 31 and the liquid crystal panel 40 are disposed on the rear side of the device.

Figure 19:
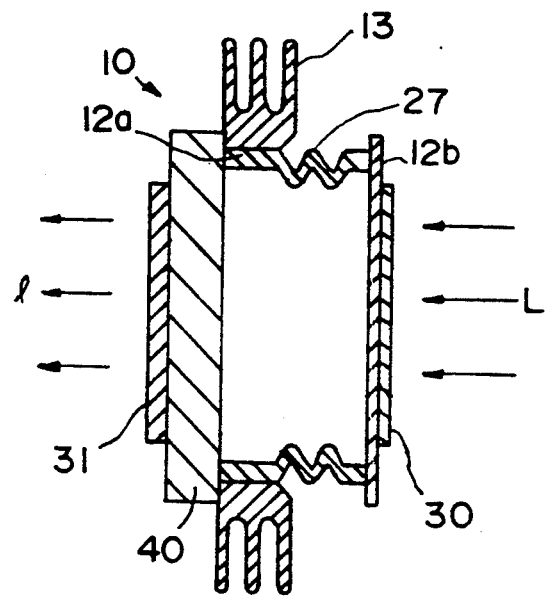
FIG. 19 is a sectional view of an eighth embodiment.

Referring to FIG. 19 showing the eighth embodiment, the surrounding wall 12a has a bellows 27 outwardly extending therefrom. Consequently, the bellows expands with thermal expansion of the coolant.

Figure 20:
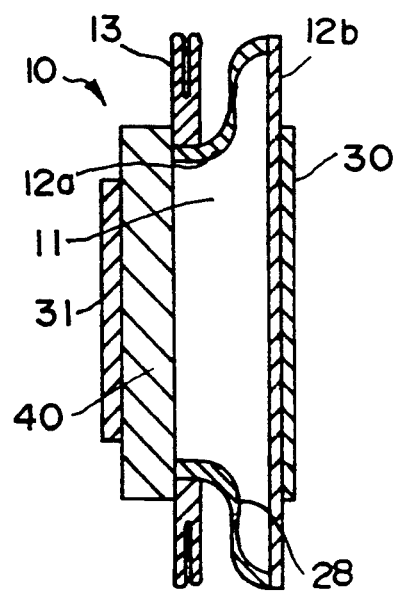
FIGS. 20 to 22 show modifications of the device.

The cooling device of FIG. 20 has the surrounding wall 12a having a flexible portion 28 which has a smaller thickness than other portions.

Figure 21:
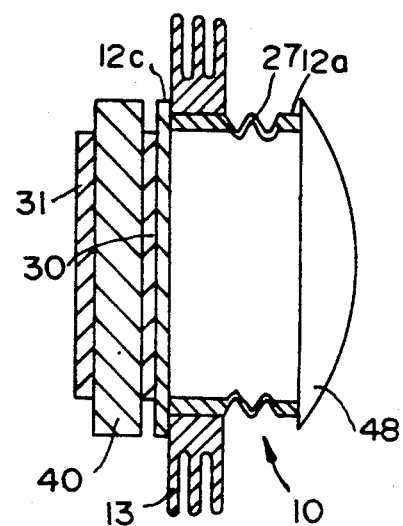

In the cooling device of FIG. 21, polarizing plates, 30, 31 and liquid crystal panel 40 are disposed on the rear side, and the condensor lens 48 is directly fixed to the surrounding wall 12a.

Figure 22:
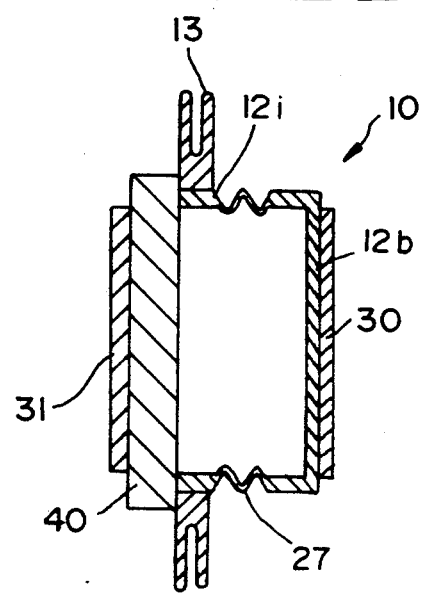
Figure 23:
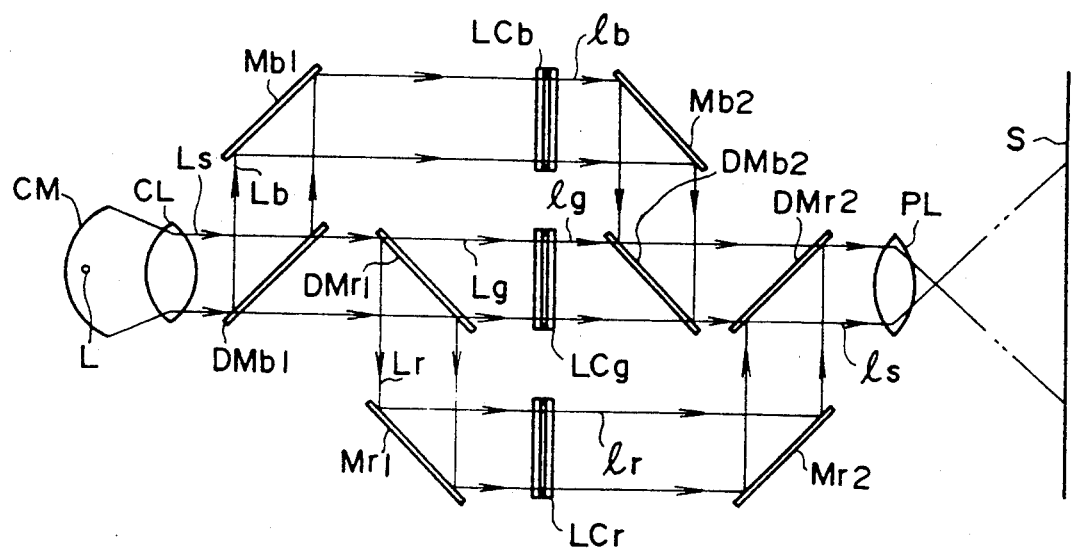
FIG. 23 is an illustration for explaining operation of a liquid crystal projector.
Figure 24:
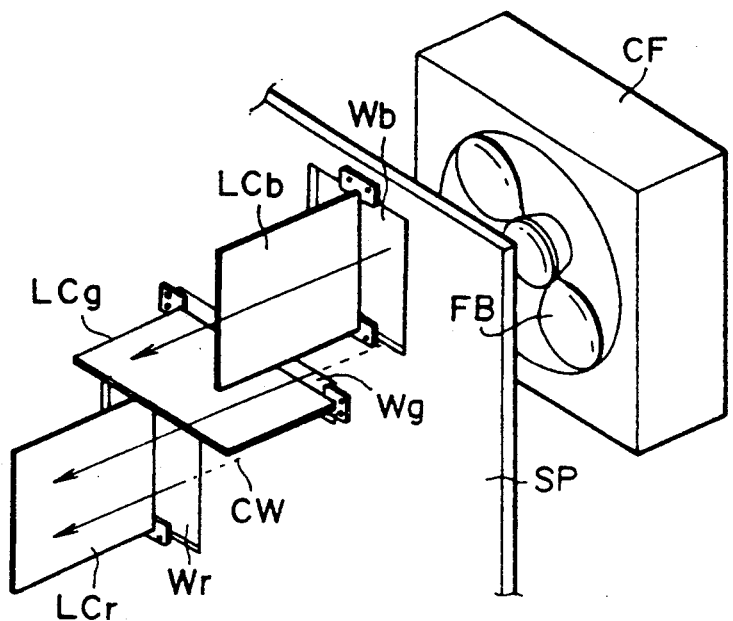
FIG. 24 is a perspective view showing a conventional air cooling system.
Figure 25:
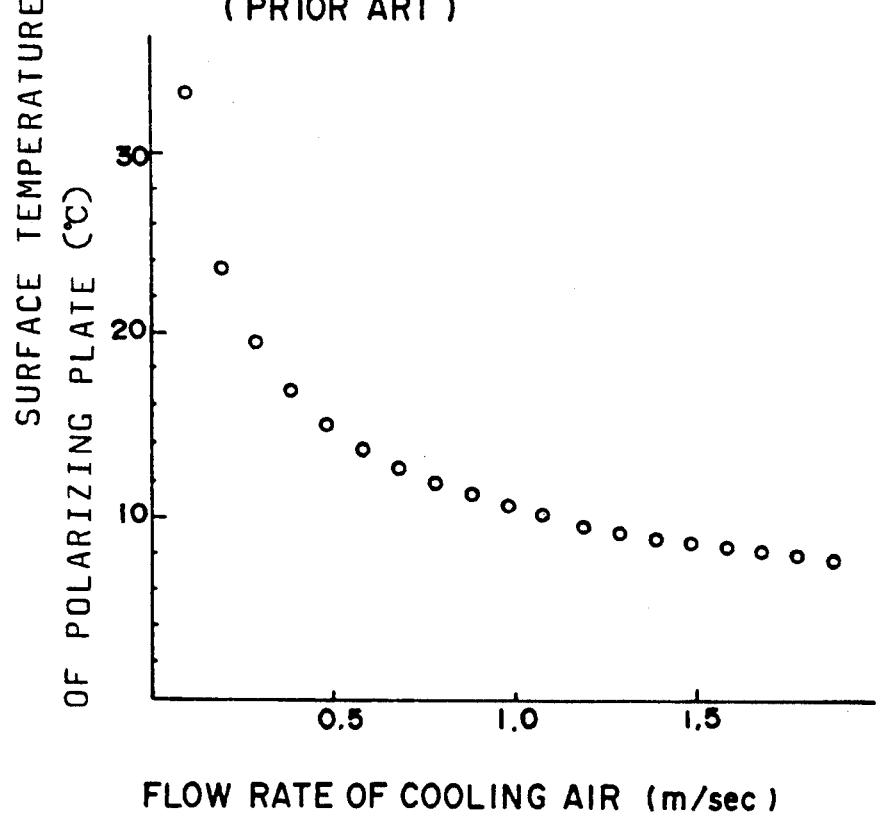
FIG. 25 is a graph showing a cooling effect of the conventional air cooling system.

The cooling device of FIG. 22 has a surrounding wall 12i made of transparent material, and hence the glass plate 12b is integral with the surrounding wall 12i.

While the presently preferred embodiments of the present invention have been shown and described, it is to be understood that this disclosure is for the purpose of illustration and the various changes and modifications may be made without departing from the scope of the invention as set forth in the appended claims.

What is claimed is:

1. A cooling device comprising:
   a closed container having a front side and a rear side, said container being filled with a liquid coolant, the container being designed so as to transmit light from the front side to the rear side;
   a polarizing plate attached to one of said sides;
   a liquid crystal panel attached to one of said sides;
   a heatsink disposed to form at least one cooling zone for reducing temperature of liquid coolant contacting said heatsink; and
   convection enhancing means in contact with the liquid coolant for forming a convection flow path of the liquid coolant between a higher temperature zone and said at least one cooling zone of the liquid coolant in the container.

2. The cooling device according to claim further comprising a heat conductive member made of perforated material and secured to an inner wall of the container so as to transmit heat of the coolant to the container.

3. The cooling device according to claim 1 wherein the convection enhancing means is a pair of vertical plates provided in the container so as to form convection flow path passages in the container.

4. The cooling device according to claim 1 wherein the convection enchancing means is a passage provided outside the container.

5. The cooling device according to claim 1 further comprising a forced circulation device for forcibly circulating the coolant in the container.

6. A cooling device comprising:
   a closed container having a front side and a rear side, said container being filled with a coolant, the container being designed so as to transmit light from the front side to the rear side;

a polarizing plate attached to one of said sides;

a liquid crystal panel attached to one of said sides;

a heatsink means for cooling the coolant; and a forced circulation device for forcibly circulating the coolant in the container.

7. The cooling device according to claim 6 further comprising pressure regulator means for regulating pressure of the coolant.

8. The cooling device according to claim 7 wherein the pressure regulating means is an expansible accumulator provided outside the container and communicated with the inside of the container.

9. The cooling device according to claim 7 wherein the pressure regulating means is one of said sides having a thickness such as to be bent with thermal expansion of the coolant.

10. The cooling device according to claim 7 wherein the pressure regulating means is a bellows formed in a part of the container.

11. The cooling device according to claim 6 wherein the forced circulation device comprises a pump, a supply pipe for supplying the coolant from the pump to the container, and a discharge pipe for discharging the coolant from the container; and said heatsink means is a heat exchanger provided for the supply pipe so as to cool the supply pipe.

12. The cooling device according to claim 1 or 6 or 16 wherein at least one of the front and rear sides is formed with a transparent material.

13. The cooling device according to claim 12 wherein the transparent material is a convex condensor lens.

14. The cooling device according to claim 13 wherein the convex condensor lens has a concave inside so that a part of the coolant serves as a part of the condensor lens.

* * * * *